US011615163B2

United States Patent
Kwatra et al.

(10) Patent No.: US 11,615,163 B2
(45) Date of Patent: Mar. 28, 2023

(54) INTEREST TAPERING FOR TOPICS

(71) Applicant: International Business Machines Corporation, Armonk, NY (US)

(72) Inventors: Shikhar Kwatra, San Jose, CA (US); Liam S. Harpur, Dublin (IE); Adam Lee Griffin, Cohasset, MN (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 17/109,418

(22) Filed: Dec. 2, 2020

(65) Prior Publication Data

US 2022/0171823 A1 Jun. 2, 2022

(51) Int. Cl.
| | |
|---|---|
| *G06F 17/00* | (2019.01) |
| *G06F 16/957* | (2019.01) |
| *G06F 16/9538* | (2019.01) |
| *G06F 16/9535* | (2019.01) |
| *G06F 16/955* | (2019.01) |

(52) U.S. Cl.
CPC ...... *G06F 16/9577* (2019.01); *G06F 16/9535* (2019.01); *G06F 16/9538* (2019.01); *G06F 16/9558* (2019.01)

(58) Field of Classification Search
CPC ............ G06F 16/9577; G06F 16/9538; G06F 16/9558; G06F 16/9535
USPC .................................. 715/255, 256, 204, 234
See application file for complete search history.

(56) References Cited

U.S. PATENT DOCUMENTS

| | | | |
|---|---|---|---|
| 9,792,584 B2 * | 10/2017 | Hariton | H04L 29/06027 |
| 10,223,426 B2 | 3/2019 | Wadley | |
| 10,366,168 B2 | 7/2019 | Wu | |
| 10,601,749 B1 * | 3/2020 | Snow | H04L 51/212 |
| 10,755,294 B1 * | 8/2020 | Podgorny | G06Q 30/0203 |
| 10,846,587 B2 * | 11/2020 | Liu | G06N 5/022 |
| 10,861,023 B2 * | 12/2020 | Cannon | G06Q 30/016 |
| 10,922,367 B2 * | 2/2021 | Podgorny | G06F 16/9535 |
| 11,237,693 B1 * | 2/2022 | Tamir | G06F 3/0481 |
| 11,341,337 B1 * | 5/2022 | Novak | G06F 40/30 |
| 11,388,467 B1 * | 7/2022 | Schweinfurth | H04N 21/42203 |
| 2003/0004781 A1 | 1/2003 | Mallon | |
| 2007/0005646 A1 | 1/2007 | Dumais | |
| 2009/0222551 A1 * | 9/2009 | Neely | G06Q 30/02 709/224 |
| 2010/0280985 A1 | 11/2010 | Duchon | |
| 2015/0026679 A1 * | 1/2015 | Flake | G06F 9/45533 718/1 |

(Continued)

OTHER PUBLICATIONS

"Configuring Content Gateway analysis," Forcepoint, accessed Nov. 19, 2020, 2 pages. <https://www.websense.com/content/support/library/web/v80/triton_web_help/scanning_options_explain.aspx>.

(Continued)

*Primary Examiner* — Stephen S Hong
*Assistant Examiner* — Matthew J Ludwig
(74) *Attorney, Agent, or Firm* — Jared C. Chaney

(57) ABSTRACT

A method comprises analyzing a first portion of content displayed on a device of a user to identify a topic of the first portion of the content; selecting a mitigation action based on the identified topic and a profile of the user, wherein the mitigation action is configured to decrease interest of the user in consuming the displayed content; and modifying the displayed content on the device of the user based on the selected mitigation action.

20 Claims, 3 Drawing Sheets

(56) References Cited

U.S. PATENT DOCUMENTS

| | | | | |
|---|---|---|---|---|
| 2015/0112918 | A1* | 4/2015 | Zheng | G06F 16/90324 706/48 |
| 2015/0178282 | A1* | 6/2015 | Gorur | G06F 16/9535 707/748 |
| 2015/0242755 | A1* | 8/2015 | Gross | G06Q 30/0241 706/46 |
| 2015/0317398 | A1* | 11/2015 | Phillips | H04L 67/306 707/E17.058 |
| 2016/0012485 | A1* | 1/2016 | Dong | G06Q 30/0263 705/14.6 |
| 2017/0185601 | A1* | 6/2017 | Qin | G06Q 50/01 |
| 2017/0212874 | A1* | 7/2017 | Urban | G06F 16/954 |
| 2018/0196796 | A1* | 7/2018 | Wu | G06N 5/022 |
| 2019/0034057 | A1* | 1/2019 | Rudchenko | G06F 3/0481 |
| 2019/0279231 | A1* | 9/2019 | Ning | G06Q 30/0202 |
| 2019/0342616 | A1* | 11/2019 | Domm | G06Q 50/01 |
| 2021/0021574 | A1* | 1/2021 | Gilboy | H04W 12/02 |

OTHER PUBLICATIONS

"IOS 12 introduces new features to reduce interruptions and manage Screen Time," Apple Newsroom, Jun. 4, 2018, 7 pages. <https://www.apple.com/ie/newsroom/2018/06/ios-12-introduces-new-features-to-reduce-interruptions-and-manage-screen-time/>.

"Web 1.0," Techopedia, Jul. 17, 2017, 2 pages. <https://www.techopedia.com/definition/27960/web-10>.

Aldous et al., "View, Like, Comment, Post: Analyzing User Engagement by Topic at 4 Levels across 5 Social Media Platforms for 53 News Organizations," Proceedings of the Thirteenth International AAAI Conference on Web and Social Media (ICWSM 2019), Jul. 6, 2019, 11 pages.

Aletras et al., "Measuring the Similarity between Automatically Generated Topics," Proceedings of the 14th Conference of the European Chapter of the Association for Computational Linguistics, Apr. 26-30, 2014, pp. 22-27. <https://citeseerx.ist.psu.edu/viewdoc/download?doi=10.1.1.689.777&rep=rep1&type=pdf>.

Appalaraju et al., "Image similarity using Deep CNN and Curriculum Learning," arXiv:1709.08761v2, Jul. 13, 2018, 9 pages. <https://arxiv.org/ftp/arxiv/papers/1709/1709.08761.pdf>.

Cetintas et al., "Method and System for Modelling Content Complexity, Consistency and Effect on User Engagement," IP.com, Disclosure No. IPCOM000246822D, Jul. 4, 2016, 6 pages. <https://ip.com/IPCOM/000246822>.

Farouk, "Measuring text similarity based on structure and word embedding," Cognitive Systems Research, vol. 63, Oct. 2020, pp. 1-10. <https://www.sciencedirect.com/science/article/abs/pii/S1389041720300218#>.

Kemp, "Digital in 2018: World'S Internet Users Pass the 4 Billion Mark," Jan. 30, 2018, 20 pages. <https://wearesocial.com/blog/2018/01/global-digital-report-2018>.

Lahkey, "Word2vec Made Easy," Towards Data Science, Apr. 16, 2019, 16 pages. <https://towardsdatascience.com/word2vec-made-easy-139a31a4b8ae>.

Lalmas, "Method and System for Measuring User Engagement and Attention in Online News Reading," IP.com, Disclosure No. IPCOM000257043D, Jan. 14, 2019, 7 pages. <https://ip.com/IPCOM/000257043>.

Tomar, "Topic modeling using Latent Dirichlet Allocation (LDA) and Gibbs Sampling explained!" Analytics Vidhya, Nov. 24, 2018, 10 pages. <https://medium.com/analytics-vidhya/topic-modeling-using-lda-and-gibbs-sampling-explained-49d49b3d1045>.

Yi et al., "System and Method for Normalizing User Engagement Signal for a content Based on Predicted Dwell time," IP.com, Disclosure No. IPCOM000237240D, Jun. 10, 2014, 3 pages. <https://ip.com/IPCOM/000237240>.

Zhao et al., "Improving User Topic Interest Profiles by Behavior Factorization," International World Wide Web Conference Committee (IW3C2), May 18-22, 2015, pp. 1406-1416.

"Web 2.0," Techopedia, Apr. 30, 2020, 3 pages. <https://www.techopedia.com/definition/4922/web-20>.

* cited by examiner

INTEREST TAPERING FOR TOPICS

BACKGROUND

Connected devices have become crucial to how many people live their lives. However, some users find it easy to become distracted from their tasks due and spend excess amounts of time consuming content not related to a task at hand. To help control the amount of time spent, some users turn to programs which can restrict access to content based on schedules, website addresses, etc. However, these binary approaches can inadvertently restrict access to content related to the user's task and are not effective in helping a user limit the time spent consuming additional content related to the task.

SUMMARY

Aspects of the disclosure may include a method, computer program product, and system. One example of the method comprises analyzing a first portion of content displayed on a device of a user to identify a topic of the first portion of the content; selecting a mitigation action based on the identified topic and a profile of the user, wherein the mitigation action is configured to decrease interest of the user in consuming the displayed content; and modifying the displayed content on the device of the user based on the selected mitigation action.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
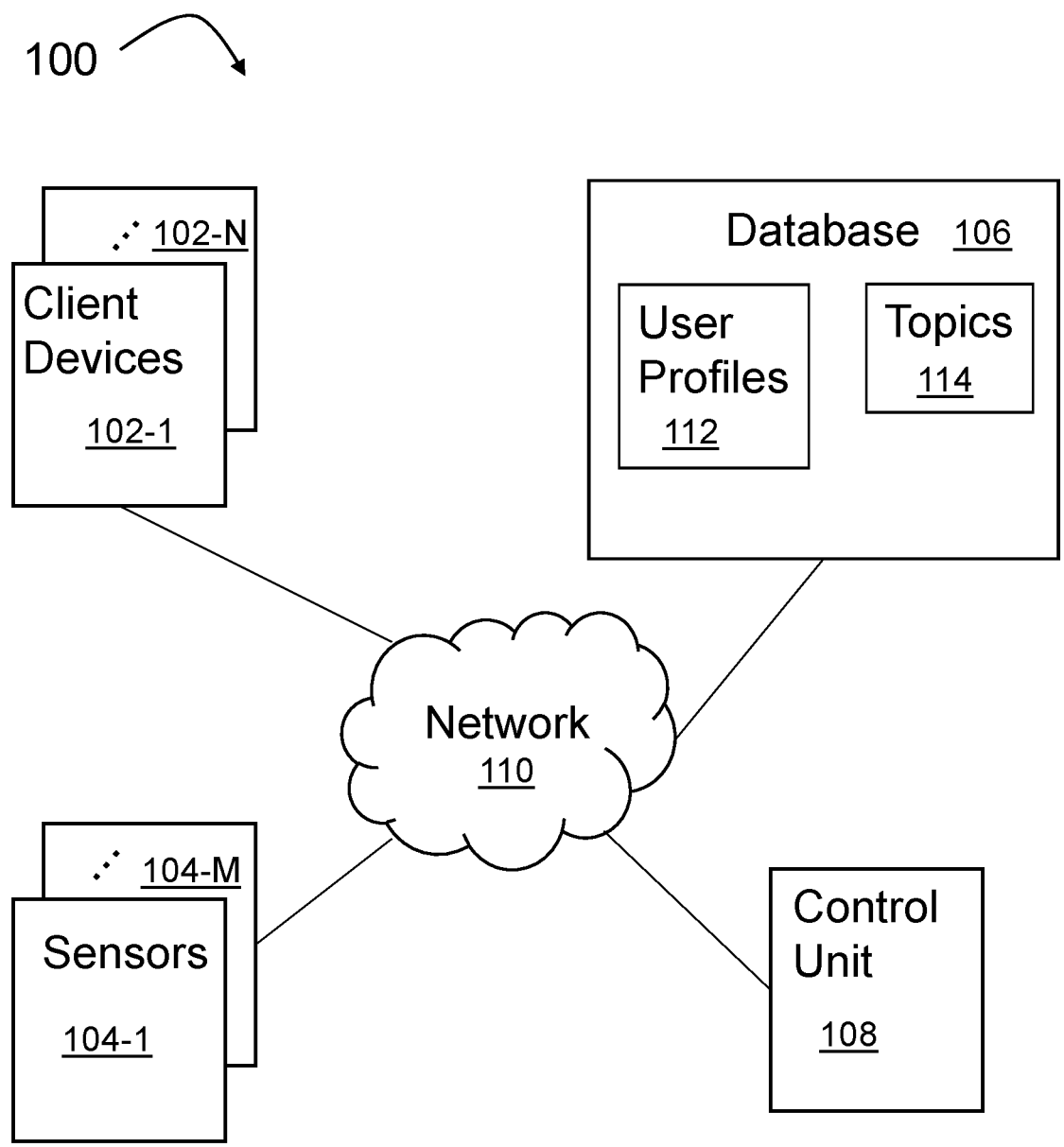
FIG. 1 is a high-level block diagram of one embodiment of an example system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, "a number of" when used with reference items, means one or more items. For example, "a number of different types of networks" is one or more different types of networks.

Further, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. In other words, "at least one of", "one or more of", and "and/or" mean any combination of items and number of items may be used from the list, but not all of the items in the list are required. The item may be a particular object, a thing, or a category. Additionally, the amount or number of each item in a combination of the listed items need not be the same. For example, in some illustrative examples, "at least one of A, B, and C" may be, for example, without limitation, two of item A; one of item B; and ten of item C; or 0 of item A; four of item B and seven of item C; or other suitable combinations.

Additionally, the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

Furthermore, the term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

FIG. 1 is a high-level block diagram depicting one embodiment of an example system 100. System 100 includes one or more client devices 102-1 . . . 102-N (herein referred to collectively as client devices 102), one or more sensors 104-1 . . . 104-M (herein referred to collectively as sensors 104), a database 106, and a control unit 108 coupled together via a network 110. Although illustrated in FIG. 1 as a single entity, in other examples network 110 may comprise a plurality of networks, such as a combination of public and/or private networks. The communications network 110 can include a variety of types of physical communication channels or "links." The links can be wired, wireless, optical, and/or any other suitable media. In addition, the communications network 110 can include a variety of network hardware and software for performing routing, switching, and other functions, such as routers, switches, base stations, bridges or any other equipment that may be useful to facilitate communicating data. Furthermore, it is to be understood that different devices in the system 100 can utilize different networks. For example, in some embodiments, some client devices 102 can be communicatively coupled to the control unit 108 via a cellular network while the database 106 and/or other client devices 102 are communicatively coupled to the control unit 108 via a private wide area network or the internet.

Additionally, it is to be understood that although control unit 108 is depicted as a separate device communicatively coupled to the client devices 102, sensors 104, and database 106 via the network 110, the control unit 108 can be implemented differently in other embodiments. For example, in some embodiments, the control unit 108 is implemented as part of the client devices 102. That is, the control unit 108 can be implemented using computing resources of the client devices 102, such as processing unit, memory, etc. In other embodiments, some functions described herein as being performed by the control unit 108 can be performed in one or more of the client devices 102 while other functions are performed by a separate device communicatively coupled to the client devices 102. Thus, the functionality described herein as being performed by the control unit 108 can be distributed across two or more devices to enable the functionality of the control unit 108 discussed herein. That is, one or more processors, interfaces, memories, etc. in each of two or more devices can be configured to implement the functionality of the control unit 108. For example, in some embodiments, one or more processes/agents can be executed on each client device to capture content to be analyzed which is then communicated to a remote server for further analysis. Thus, it is to be understood that the control unit 108 can be implemented differently in various embodiments.

Each of the client devices 102 is configured with a display to display data for user consumption. For example, each client device 102 can be implemented as one of a laptop computer, a desktop computer, a tablet, handheld smart phone, smart watch, or other device configured with a display screen to present data to a user. The control unit 108 is configured to analyze at least a portion of the content being displayed to a user by a client device 102 in order to identify a topic of the displayed content. For example, in some embodiments, the portion of the displayed content to be analyzed is the text of a search query. Thus, in some such embodiments, the control unit 108 can collect the user input from a user input device, such as a keyboard, touchscreen, microphone, etc. In other embodiments, the text of the search query can be captured and sent to the control unit 108 as part of sending the search query to a remote computer for processing. Furthermore, in other embodiments, the portion of the displayed content to be analyzed can include, but is not limited to, test of a search query, text of an article, text of a webpage, images, videos, article titles, suggested content, etc. The analysis of the displayed content can be performed by a process or application running on the client device, in some embodiments. In other embodiments, the analysis of the displayed content can be performed by a separate device communicatively coupled to the client device.

To perform the analysis of the displayed content and identify a topic of the displayed content, the control unit 108 can be configured to utilize natural language processing and/or machine learning techniques. Machine learning techniques utilized by the control unit 108 can comprise algorithms or models that are generated by performing supervised, unsupervised, or semi-supervised training on a dataset, and subsequently applying the generated algorithm or model to identify topics of content and develop user profiles. Machine learning techniques can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning techniques can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

NLP techniques utilized by the control unit 108 can include, but are not limited to, semantic similarity, syntactic analysis, and ontological matching. For example, in some embodiments, a processor of control unit 108 can be configured to parse to determine semantic features (e.g., word meanings, repeated words, keywords, etc.) and/or syntactic features (e.g., word structure, location of semantic features in headings, title, etc.) of displayed content, such as text of an article, etc.

Thus, the control unit 108 can identify a topic based on analyzing items such as, but not limited to, a search query, search results, a displayed article, displayed images, displayed videos, suggested links, etc. The content can be displayed, for example, in a browser of the client device 102 or another application/program being executed by the client device 102. In addition to determining a topic being consumed by the user, the control unit 108 also accesses a user profile 112 for the user. The user profile 112 includes information personalized to the user for mitigating distractions. For example, the user profile 112 can include a list of topics that are of interest to a user as well as topics which are not of interest to the user. For example, in some embodiments, the user profile 112 groups topics into one of a plurality of groups indicating a relative interest, e.g. high interest, moderate interest, no interest, etc. In other embodiments, each topic can be given a rating indicating a relative interest (e.g. a scale of 1-100 with 1 being no interest and 100 being most interest). In other embodiments, other techniques can be used to indicate a user's interest in a topic in the user profile 112.

In some embodiments, the user can provide information identifying which topics are of interest or not to provide an initial baseline for the system 100. The user can also provide user input to modify interest levels during use of the system 100. In addition, in some embodiments, the system uses machine learning to identify topics that are of interest to the user based on monitoring actions of the user, such as, but not limited to, the amount of time spent reading articles related to a topic, the number of related links clicked on by the user for a given topic, how frequently (e.g. how many times a day or week) the user consumes content (e.g. articles, videos, images, etc.) related to a given topic, and/or avoidance of topics (such as by not clicking on suggested videos, articles, links, etc.). Thus, the control unit 108 can build a user profile indicating which topics are of interest or not. In some embodiments, the control unit 108 updates an initial baseline provided by the user by monitoring actions of the user. In other embodiments, the user does not provide an initial baseline and the control unit 108 builds a personalized user profile for each user from either a default baseline or no initial data.

In addition to identifying topics that are of interest or not of interest, the control unit 108 also learns which topics are likely to cause distractions. For example, on many webpages suggested content, such as suggested articles, videos, links, etc. can be displayed to the user. The control unit 108 can track which suggested topics (i.e. topics associated with the suggested content) presented to a user are likely to be clicked on or viewed by the user based on historical actions of the user observed by the control unit 108. Furthermore, the control unit 108 can monitor other factors which influence whether the user is likely to select a given topic, such as location of the user, time of day, day of the week, similarity of a suggested topic to the content currently being displayed on the client device 102, etc.

The control unit 108 is also configured to learn and identify which mitigation actions help limit distractions for a given user. As used herein, the term mitigation action refers to a modification of content displayed on a client device that is configured to decrease a likelihood or probability that the user will continue to be interested in consuming the content of the topic displayed on the client device such that user will move on to new activities/topics. Furthermore, as used herein, consuming content refers to viewing, reading, or otherwise interacting with the content being displayed. Also, as used herein, the term suggested content refers to content that is displayed on a device which includes additional content for the user to consume by clicking on an associated link, video, etc. Examples of suggested content can include, but are not limited to, links to articles displayed together with an article being read, stories with links displayed on a user's social media platform, results of a search query, etc. Additionally, a topic can be identified as a distraction for a user either explicitly by a user or through observation by the control unit 108 of the user spending above a threshold amount of time on the topic. Example mitigation actions include, but are not limited to, modifying the displayed content to include suggested articles that have the same or similar headlines, descriptions, images, and/or titles as the current article being consumed, adjusting a number and/or placement of advertisements during a given article review/visit, adjusting suggested content to include topics not of interest to the user, adjusting text characteristics (e.g. font, word count, spacing, etc.), and re-ordering search results.

Furthermore, the control unit 108 is configured in some embodiments to learn effectiveness of different mitigation actions for a given user and topic. For example, the effectiveness of a given mitigation action can be dependent on various factors such as, but not limited to, the time of day, location, topic, etc. Thus, the control unit 108 learns and associates the effectiveness of different mitigation actions with the monitored factors. In addition, the control unit 108 learns how much modification is necessary (i.e., intensity of a given mitigation action) for each mitigation action with respect to a given user, topic, etc. For example, the control unit 108 can learn a threshold number of duplicated/similar article headlines, a threshold number of duplicated/similar article descriptions, a threshold number of duplicated/similar article images, threshold number of text characteristic changes, a threshold number of advertisements, and/or a threshold number of suggested content directed to topics not of interest to the user in order to decrease the interest of the user in continuing to consume content related to the initial topic of the displayed content.

In addition to learning thresholds related to the intensity of the mitigation actions, the control unit 108 can also be configured to determine thresholds related to when to initiate a mitigation action. For example, the control unit 108 can learn when to initiate a mitigation action based on factors such as, but not limited to, time of day, location of the user, day of the week, topic of the displayed content, amount of time spent consuming content related to the topic, etc. In some embodiments, the user can provide input for settings related to when to initiate a mitigation action based on factors, such as those discussed herein. For example, the user can set different time limits based on topics, time of day, etc. before initiating a mitigation action. The settings can be set by the user consuming the content, in some embodiments, or by another user in other embodiments. For example, a parent can input the settings for a child's device, in some embodiments.

In some embodiments, the control unit 108 can be configured to determine/modify the settings in addition to or in lieu of receiving user input for the settings. For example, the control unit 108 can be configured to determine the amount of time the user normally takes to read an article. This can be accomplished, in some embodiments, by tracking over a period of time how much time the given user spends on reading articles of similar length and complexity. Additionally, the control unit 108 can identify the amount of text in an article and baseline the average amount of time it takes other similar users to read the text of the article. For example, the control unit 108 can collect data from the one or more sensors 104 to identify information related to the given user, such as age, to identify similar users. For example, the sensors 104 can include a camera to capture images of the user to identify an approximate age range for the user, in some embodiments. Thus, based on crowd-sourced data from other similar users, the control unit 108 can determine a baseline average for an amount of time to read the article given the number of lines, words, etc. in the article. The default baselines can be based on user data gathered from the sensors 104 to provide the control unit 108 with context information. In some such embodiments, the context information can be correlated with an average historical browsing time per category/topic having upper and lower limits identified from other similar users. Then the default baseline is normalized and a unique profile sequence for the specific user is created for the user by the control unit 108.

The personalized baseline can be created by leveraging data from the client device, such as, but not limited to cookies, browser history, monitoring via a browser plug-in/extension, or monitoring through a client-side or server-side software agent. Thus, the control unit 108 updates the baseline for the specific given user based on observations of the given user. For example, the sensors 104 can include keyloggers, cameras, and/or other sensors to detect user behavior while reading an article, such as, but not limited to, scrolling speed, gaze tracking, etc. to determine an average amount of time for the given user to read an article based on the number of lines, words, etc. in the article. The amount of time for a user to read an article can also be determined on a per topic basis as some topics may require more time than other topics. Based on the amount of time estimated for the user to spend on the article, the control unit 108 can update a timer or threshold before initiating a mitigating action to decrease interest of the user in continued consumption of content related to the topic of the article.

In some embodiments, the personalized data is stored on one or more of the user's client devices 102. In other embodiments, a user can be presented with an option to store the personalized data in the user profile on a remote device, such as in cloud storage. In some embodiments, the control unit 108 is configured to utilize transfer learning in that a base model or profile is stored in a remote device. The base profile is transferred to the client device 102 where personalization is applied to the base profile and stored on the client device 102. In such embodiments, personalized data is stored on the client device 102, while templates or base profiles are stored on a remote device. Thus, although the database 106 is depicted as a single separate device in FIG. 1 for purposes of explanation, it is to be understood that the database 106 can be distributed and implemented as part of other devices in system 100. For example, the database can include memory or storage on one or more client devices 102 and/or control unit 108.

In addition, the sensors 104 can be used to determine if a user is being distracted from a task. For example, in some embodiments, the control unit 108 can analyze past actions of the user to develop patterns of behavior. Based on the patterns, the control unit 108 can determine a type of task which the user normally works on at a given time of day, for example. In other embodiments, the user may indicate explicitly by providing user input via a client device 102 which task the user is working on. The control unit 108 can communicate with the sensors 104 to determine if the user has become distracted from the task the user is working on. For example, with the user's permission, the control unit 108 may periodically activate a camera on one or more client devices 102 to determine the focus of the user. As an example, if the user is working on a desktop computer, the control unit 108 can periodically turn on a webcam of the desktop for brief periods of time to capture images of the user. The control unit 108 uses machine learning techniques, such as those discussed above, to analyze the image to determine if the user's focus is on the screen of the desktop. Additionally, where the user has more than one client device 102, such as a smart phone and a desktop computer, the control unit 108 can periodically turn on a camera of both the smart phone and the desktop to determine the focus of the user.

If the focus of the user is not on the task the user normally works on or has explicitly indicated, then the control unit 108 can select a mitigation action to cause the user to re-focus. For example, if the analysis of the images from one or more of the client devices 102 indicates that a user has been focused on the screen of a smart phone for more than a threshold period of time, the control unit 108 can select a mitigation action to alter the content displayed on the smart phone such that the interest of the user in continuing to consume content on the smart phone will decrease and the user will refocus on the screen of the desktop and, thus, the original task of the user. Thus, in some embodiments, the client devices 102 can communicate to determine the focus of the user and select a mitigation action. As in the example provided above, analysis of images from the desktop computer camera can determine that the user is focused on the smart phone which can be communicated to functionality of the control unit 108 implemented on the smart phone in order to execute a mitigation action on the smart phone. Thus, as described above, the functionality of the control unit 108 can be distributed across multiple client devices 102 in some embodiments. In other embodiments, a single device can implement the functionality of the control unit 108 and communicate via the network 110 with various client devices 102 to execute the mitigation action.

In operation, a user can begin consuming content on the client device 102 in response to a search using a search engine, opening a link contained in a text message or email, etc. The control unit 108 can be triggered to monitor the displayed content and user interaction with the content in response to an email or text message containing the link being received, placement of the content on a wiki page or blog, submission of a search query, etc. The control unit 108 is configured to analyze at least a portion of the content displayed on the screen to identify the topic being consumed by the user, as discussed above. For example, the control unit 108 can use NLP to analyze the text of the search query or the search results, perform image analysis on images or videos, etc. Furthermore, in some embodiments, the database 106 contains information regarding a plurality of different topics 114. Thus, the control unit 108 can compare the results of the analysis of the content being consumed with data for previously identified topics in order to determine the topic of the content currently being consumed by the user.

After identifying a topic of the content being consumed, the control unit 108 determines if a mitigation action is needed or desired for the given topic. For example, in some embodiments, a user can specify not to mitigate the amount of time spent on certain topics and/or explicitly identify topics for which mitigation is desired. If a mitigation action is desired, the control unit 108 selects a mitigation action based on various factors, such as, but not limited to, the determined topic of the content being consumed, the time of day, the location of the user, etc., as described above.

The control unit 108 then applies the selected mitigation action to modify content displayed on the client device 102 in order to cause the user to voluntarily reduce excessive consumption of that topic. For example, in some embodiments, the control unit 108 modifies search results such that results related to topics not of interest to the user appear earlier than results related to the topic to be mitigated. In some embodiments, the control unit 108 is configured to modify suggested articles, videos, links, etc. For example, some social media sites include a list of articles that a user may be interested in viewing either based on relation to the current topic, relationship of other users to the current user (e.g. articles posted by friends of the user), etc. In some such embodiments, when the mitigation action is applied, the control unit 108 causes the list of suggested content to display topics that are not of interest to the user. Furthermore, in some such embodiments, the number of topics not of interest to the user are increased either the further down the user scrolls or the more time the user spends on a given topic to be mitigated.

The suggested content can also be modified by causing duplicated or similar headlines to be displayed, by causing duplicated or similar article descriptions to be displayed, and/or by causing duplicated or similar images to be displayed. Additionally, the control unit 108 can modify the text of suggested content to have text characteristics which reduce the user's interest in reading the article, such as, but not limited to, font, word count, spacing, and/or a number and placement of advertisements in the text of the suggested content. As discussed above, the intensity or amount of modifications can be based on a threshold beyond which the user exhibits less interest in continuing consumption of the topic. For example, the control unit 108 can use machine learning and historical data of the user to identify patterns of user behavior to determine the thresholds. As discussed above, the thresholds can include, but are not limited to, the number of advertisements, the number of similar article titles/descriptions/images, etc.

Furthermore, as discussed above, the topics for which mitigation are applied can change based on various factors, such as time of day, location, etc. and are personalized for each user. Thus, the control unit 108 is configured to dynamically select and apply the mitigation action based on such factors. Through the use of these mitigation factors, the system 100 is able to cause the user to voluntarily curtail the amount of time spent on distracting topics without requiring binary decisions such as blocking all distracting content, or blocking specific websites, etc. Thus, the user experience is improved while at the same time enabling the limiting of the amount of time spent on distractions. Furthermore, the system 100 is able to learn through machine learning and adapt to the user, as discussed above, by applying analysis and personalization to baseline or default settings according to observed user behavior over the course of time.

Figure 2:
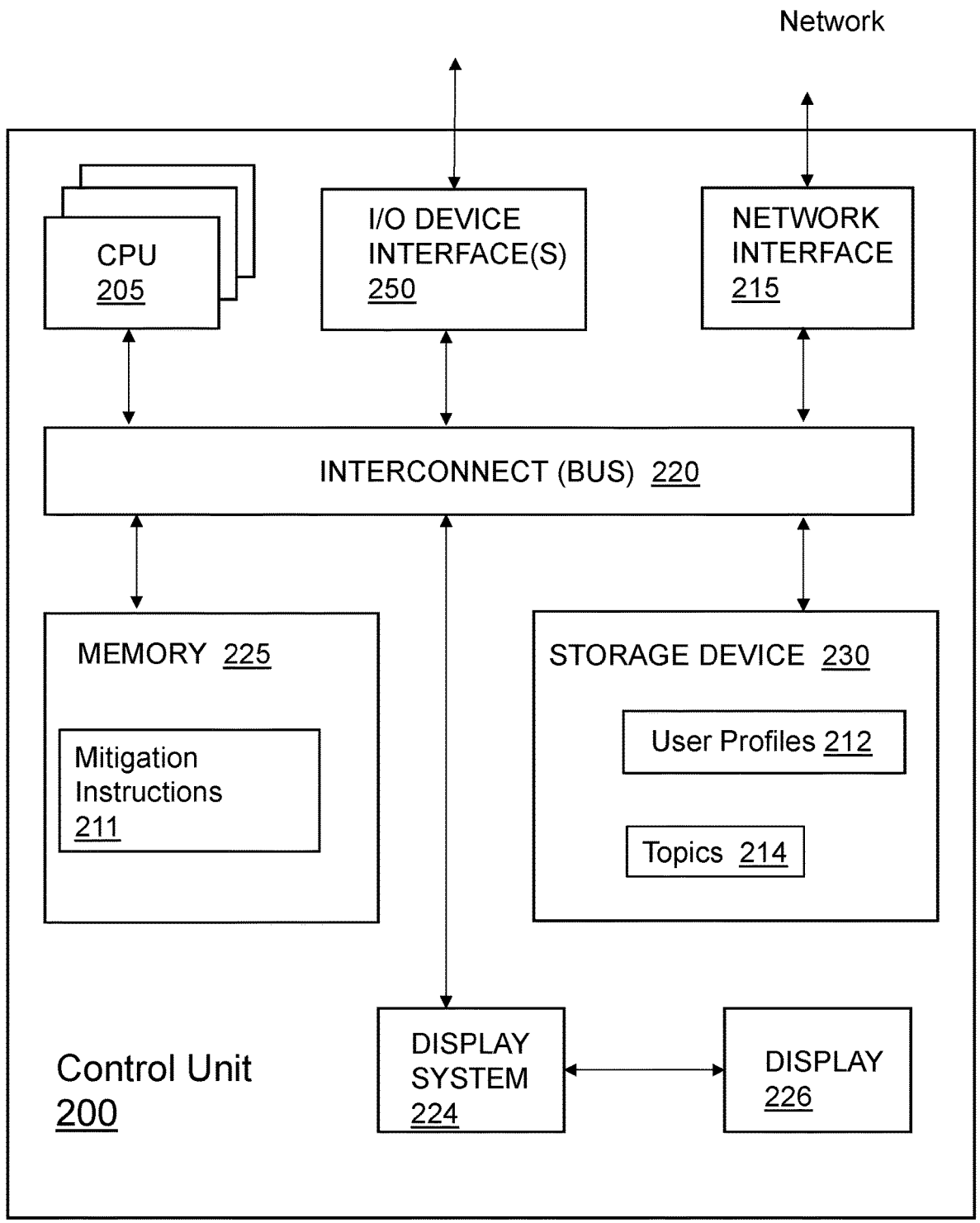
FIG. 2 is a high-level block diagram of one embodiment of an example control unit.

FIG. 2 is a high-level block diagram of one embodiment of an example control unit 200. The control unit 200 can be implemented as control unit 108 in FIG. 1. Furthermore, as discussed above, the control unit 200 can be implemented as part of a client device 102 or as a separate device. In the example shown in FIG. 2, the control unit 200 includes a memory 225, storage 230, one or more processors 205 (also referred to as CPU 205 herein), an I/O device interface 250, a display system 224, a display device 226, and a network interface 215 communicatively coupled via an interconnect (e.g., BUS) 220. It is to be understood that the control unit 200 is provided by way of example only and that the control unit 200 can be implemented differently in other embodiments. For example, in other embodiments, some of the components shown in FIG. 2 can be omitted and/or other components can be included.

The I/O device interface 250 supports the attachment of one or more user I/O devices, which may include user output devices and user input devices (such as a keyboard, mouse, keypad, touchpad, trackball, buttons, light pen, or other pointing devices). A user can manipulate the user input devices using a user interface, in order to provide input data and commands to the user I/O device interface 250. The display system 224 includes a display controller, a display memory, or both. The display controller can provide video, still images, audio, or a combination thereof to a display device 226. The display memory may be a dedicated memory for buffering video data. The display system 224 is coupled with the display device 226. In some embodiments, the display device 226 also includes one or more speakers for rendering audio. Alternatively, one or more speakers for rendering audio may be coupled with I/O device interface 250. In alternate embodiments, one or more functions provided by the display system 224 are on board an integrated circuit that also includes one or more processors 205.

Each CPU 205 retrieves and executes programming instructions stored in the memory 225 and/or storage 230. The interconnect 220 is used to move data, such as programming instructions, between the CPU 205, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices communicatively coupled to the device provisioning system 200 via a communication network coupled to the network interface 215. Thus, the user profiles 212 and topics 214 depicted as being stored on storage 230, in this example, can be stored in a separate database, such as database 106 in FIG. 1, in other embodiments as discussed above.

Additionally, in some embodiments, the memory 225 stores mitigation instructions 211 and the storage 230 stores user profiles 212 and topics 214. However, in other embodiments, the mitigation instructions 211, user profiles 212 and topics 214 are stored partially in memory 225 and partially in storage 230, or they are stored entirely in memory 225 or entirely in storage 230. Additionally, although storage 230 is depicted as a single monolithic entity and the memory 225 is depicted as a single monolithic entity, it is to be understood that, in other embodiments, the storage 230 and/or the memory 225 can each be comprised of a plurality of separate memory devices.

When executed by the CPU 205, the mitigation instructions 211 cause the CPU 205 to perform a method such as method 300 discussed below. In particular, the mitigation instructions 211 cause the CPU 205 to perform the functionality of control unit 108 discussed above, such as identifying a topic being consumed, selecting a mitigation action, and executing the mitigation action to alter content displayed on a display, as described herein. As discussed above, in to identify topics being consumed, selecting a mitigation action, and executing the mitigation action, the mitigation instructions 211 cause the CPU 205 to access the user profiles 212 and lists of topics 214.

Furthermore, as discussed above, in some embodiments, one or more of the components and data shown in FIG. 2 include instructions or statements that execute on the processor 205 or instructions or statements that are interpreted by instructions or statements that execute on the processor 205 to carry out the functions as described herein. In other embodiments, one or more of the components shown in FIG. 2 are implemented in hardware via semiconductor devices, chips, logical gates, circuits, circuit cards, and/or other physical hardware devices in lieu of, or in addition to, a processor-based system.

Figure 3:
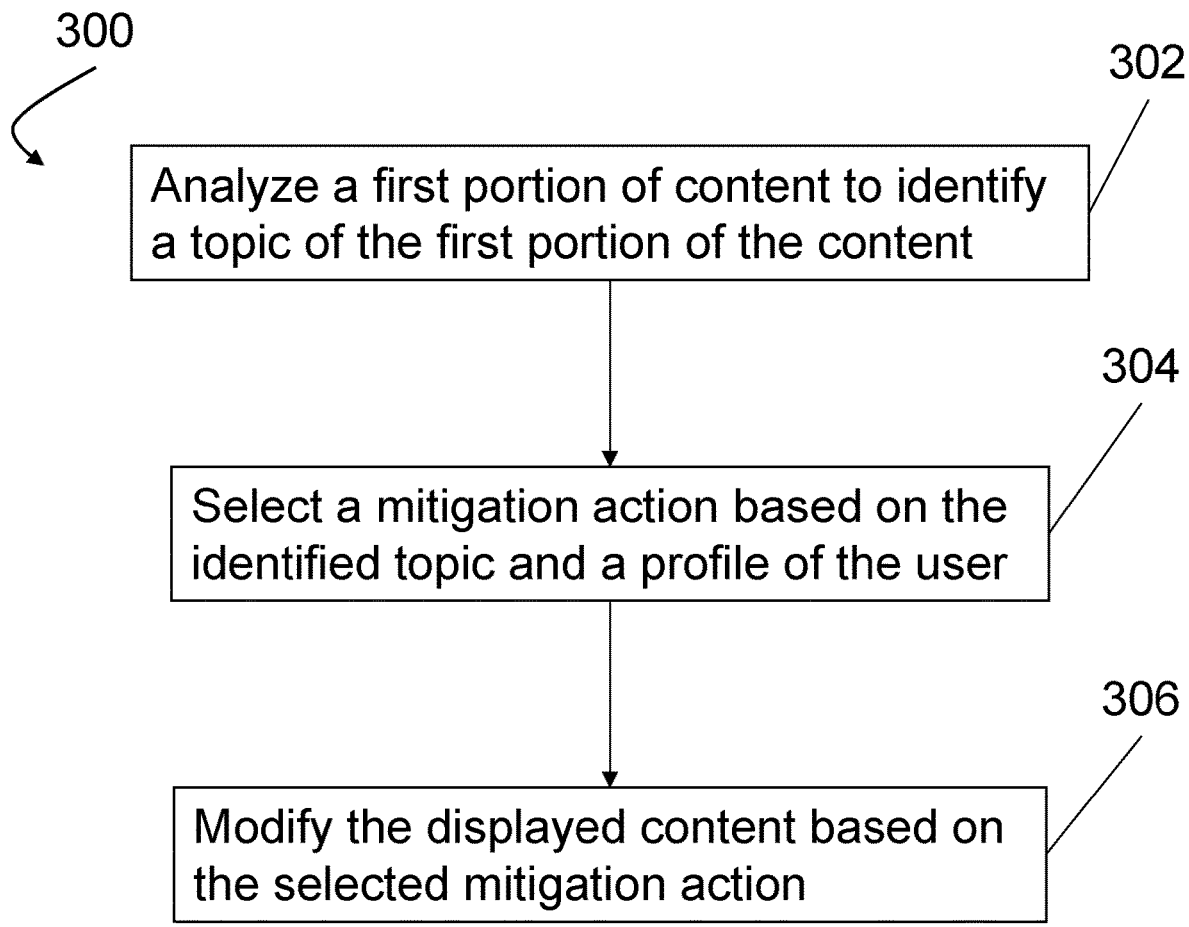
FIG. 3 is a flow chart depicting one embodiment of an example method of interest tapering for topics.

FIG. 3 depicts one embodiment of an example method 300 of interest tapering for topics. The method 300 can be implemented by a control unit, such as control unit 108. For example, the method 300 can be implemented by a CPU, such as CPU 205 in control unit 200, executing instructions, such as mitigation instructions 211. It is to be understood that the order of actions in example method 300 is provided for purposes of explanation and that the method can be performed in a different order in other embodiments. Similarly, it is to be understood that some actions can be omitted or additional actions can be included in other embodiments.

At block 302, a first portion of content displayed on a device of a user is analyzed to identify a topic of the first portion of the content. For example, as described above, the first portion can include text of a search query, text of an article being displayed, a video, one or more images, etc. At block 304, a mitigation action based on the identified topic and a profile of the user is selected. As described above, the user profile can indicate which topics are of interest and which are not of interest for the user. Additionally, as described above, the user profile can indicate which mitigation actions are most likely to be effective for the identified topic. The selected mitigation action is configured to decrease interest of the user in consuming the displayed content. In addition, the user profile can include other factors, such as time of day, location, etc., for selecting a mitigation action, as discussed above.

At block 306, the displayed content is modified based on the selected mitigation action. For example, as discussed above, modifying the displayed content based on the selected mitigation action can include, but is not limited to, altering displayed results of a search query; altering suggested content to include links to webpages having similar titles, similar images, or similar text; increasing a number of advertisements displayed with the first content to at least a threshold number of advertisements and altering placement of the advertisements in the displayed content; and altering suggested content displayed on the device to include suggested content associated with topics not of interest to the user.

In addition, in some embodiments, the modification of the content is delayed until after a threshold amount of time has elapsed, as discussed above. Thus, in some embodiments, modifying the content based on the selected mitigation action includes tracking an amount of time spent by the user consuming content related to the identified topic; comparing the tracked amount of time to a threshold associated with the identified topic; and modifying the displayed content based on the selected mitigation action in response to determining that the tracked amount of time exceeds the threshold associated with the identified topic. Therefore, as discussed above, the embodiments described herein cause the system to modify content such that the interest of the user in consuming the content is decreased naturally and voluntarily. In this way, binary restrictions on content are not required which enables a user to consume content, but at the same time helps the user limit the amount of time spent on a given topic. Additionally, the system can learn from observation of actions of the user to improve the ability to taper the user's interest in a topic in order to help the user limit the time spent on a given topic.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
   analyzing a first portion of content displayed on a device of a user to identify a topic of the first portion of the content;
   determining that the user has spent more than a threshold amount of time on the topic,
   selecting a mitigation action based on the determining,
      wherein a profile of the user includes a list of topics that are of interest to the user,
      wherein the topic is included in the list of topics,
      wherein the mitigation action is configured to decrease interest of the user in consuming the displayed content related to the topic; and
   modifying the displayed content on the device of the user based on the selected mitigation action.

2. The method of claim 1, wherein the first portion of content includes text of a search query.

3. The method of claim 1, wherein the first portion of content includes text of a webpage.

4. The method of claim 1, wherein modifying the displayed content based on the selected mitigation action comprises altering displayed results of a search query to include topics not of interest to the user.

5. The method of claim 1, wherein modifying the displayed content based on the selected mitigation action comprises altering suggested content displayed on the device to include links to webpages having similar titles, similar images, or similar text.

6. The method of claim 1, wherein modifying the displayed content based on the selected mitigation action comprises increasing a number of advertisements displayed with the first portion of content to at least a threshold number of advertisements and altering placement of the advertisements in the displayed content,
   wherein the threshold is a number beyond which the user exhibits less interest in continuing consumption of the topic.

7. The method of claim 1, wherein modifying the displayed content based on the selected mitigation action comprises altering suggested content displayed on the device to include suggested content associated with topics not of interest to the user.

8. The method of claim 1, wherein modifying the displayed content based on the selected mitigation action further comprises:
   tracking an amount of time spent by the user consuming content related to the identified topic;
   comparing the tracked amount of time to the threshold associated with the identified topic; and
   modifying the displayed content based on the selected mitigation action in response to determining that the tracked amount of time exceeds the threshold associated with the identified topic.

9. The method of claim 1, further comprising:
   determining the effectiveness of the mitigation action for the topic; and
   modifying the intensity of the mitigation action based on the effectiveness.

10. The method of claim 1, wherein the mitigation action includes adjusting the content to include topics not of interest to the user, and
    wherein the first portion of the content is modified to include the topics not of interest to the user.

11. The method of claim 1, wherein the threshold amount of time is variable based on the topic and the time of day.

12. A system comprising:
    a display device configured to display content; and
    a processor communicatively coupled to the display device, wherein the processor is configured to:
    analyze a first portion of content displayed on the display device to identify a topic of the first portion of the content;
    determine that the user has spent more than a threshold amount of time on the topic,
    select a mitigation action based on the determining,
       wherein a profile of the user includes a list of topics that are of interest to the user,
       wherein the topic is included in the list of topics,
       wherein the mitigation action is configured to decrease interest of the user in consuming the displayed content related to the topic; and
    modify the displayed content on the display device based on the selected mitigation action.

13. The system of claim 12, wherein the first portion of content includes one of text of a search query and text of a webpage.

14. The system of claim 12, wherein the processor is configured to modify the displayed content based on the selected mitigation action by altering displayed results of a search query.

15. The system of claim 12, wherein the processor is configured to modify the displayed content based on the selected mitigation action by altering suggested content displayed on the display device to include links to webpages having similar titles, similar images, or similar text.

16. The system of claim 12, wherein the processor is configured to modify the displayed content based on the selected mitigation action by increasing a number of advertisements displayed with the first content to at least a threshold number of advertisements and by altering placement of the advertisements in the displayed content.

17. The system of claim 12, wherein the processor is configured to modify the displayed content based on the selected mitigation action by altering suggested content displayed on the device to include suggested content associated with topics not of interest to the user.

18. The system of claim 12, wherein the processor is configured to modify the displayed content based on the selected mitigation action by:
  tracking an amount of time spent by the user consuming content related to the identified topic;
  comparing the tracked amount of time to the threshold associated with the identified topic; and
  modifying the displayed content based on the selected mitigation action in response to determining that the tracked amount of time exceeds the threshold associated with the identified topic.

19. A computer program product comprising a computer readable storage medium having a computer readable program stored therein, wherein the computer readable program, when executed by a processor, causes the processor to:
  analyze a first portion of content displayed on a display device to identify a topic of the first portion of the content;
  determine that the user has spent more than a threshold amount of time on the topic,
  select a mitigation action based on the determining,
    wherein a profile of the user includes a list of topics that are of interest to the user,
    wherein the topic is included in the list of topics,
    wherein the mitigation action is configured to decrease interest of the user in consuming the displayed content related to the topic; and
  modify the displayed content on the display device based on the selected mitigation action.

20. The computer program product of claim 19, wherein the computer readable program is further configured to cause the processor to modify the displayed content based on the selected mitigation action by altering displayed results of a search query.

\* \* \* \* \*